United States Patent [19]

Mori et al.

[11] 4,410,975
[45] Oct. 18, 1983

[54] STEREOPHONIC PICK-UP CARTRIDGE

[75] Inventors: Yoshihisa Mori; Mitsuru Takashima, both of Tokyo, Japan

[73] Assignee: Sony Corporation, Tokyo, Japan

[21] Appl. No.: 269,556

[22] Filed: Jun. 2, 1981

[30] Foreign Application Priority Data

Jun. 5, 1980 [JP] Japan .................................. 55-75950

[51] Int. Cl.³ .............................................. G11B 3/44
[52] U.S. Cl. ................................................... 369/170
[58] Field of Search ............... 369/170, 171, 172, 173, 369/135, 136, 139

[56] References Cited

U.S. PATENT DOCUMENTS

| | | | |
|---|---|---|---|
| 2,578,809 | 12/1951 | Ketchum | 369/170 |
| 3,926,441 | 12/1975 | Hibi et al. | 369/170 |
| 3,983,335 | 9/1976 | Nemoto | 369/170 |

*Primary Examiner*—Steven L. Stephan
*Attorney, Agent, or Firm*—Hill, Van Santen, Steadman & Simpson

[57] ABSTRACT

A stereophonic pick-up cartridge which has a cantilever having a stylus on a free and thereof and an armature at the rear end thereof, a fixed support and a damper having a first plane surface abutting on the support and a second plane surface abutting on the armature. Grooves are formed in the second plane surface of the damper. The provision of the grooves results in improved isolation between the left and right channels during playback and results in an improved stereophonic pick-up cartridge.

7 Claims, 9 Drawing Figures

STEREOPHONIC PICK-UP CARTRIDGE

BACKGROUND OF THE INVENTION

1. Field of the Invention

The present invention relates in general to a stereophonic pick-up cartridge and particularly to a supporting mechanism for the armature of a pick-up cartridge.

2. Description of the Prior Art

Generally, a supporting mechanism for the armature of a pick-up cartridge of the moving magnet or moving coil type are as illustrated in FIGS. 1 and 2.

As shown in FIG. 1, a cantilever 1 is hollow and has a stylus 2 on one end thereof and carries an armature 3 at the other end. The armature 3 would be a magnet if the device is a moving magnet type or it would comprise a coil bobbin including coils if the cartridge is of a moving coil type. The armature 3 is generally disc-shaped and is attached to the rear end of the cantilver 1 with the cantilever 1 extending through a central opening formed in the armatrue 3. A piano wire 4 extends through the opening in the armature 3 and the opening through the cantilever 1 and has one end attached to a suspension sleeve 5 which is connected to an axial bore of a matallic holder 6 and the other end of the piano wire is connected to the cantilver 1 adjacent the stylus 2. Between the end plane of the matallic holder 6 and the armature 3 is mounted a cylindrical shape damper 7 which is formed with the central opening so as to allow the cantilever to move in response to tracking of the stylus in the grooves of a record. The damper 7 has a central aperture for the piano wire 4 and the suspension sleeve 5 and may be made from a flexible substance such as rubber for example. The armatrue 3 is firmly pressed against the damper 7 by the tension of the piano wire 4.

FIG. 2 is an enlarged perspective view of the essential parts of the cartridge illustrated in FIG. 1. With the construction illustrated in FIG. 1 of the prior art device, it is difficult to eliminate vibration mutual interference of the armature 3 in the directions indicated by the arrows A—A' which is identified as "vibration of the right direction" and which results from transducing the right channel electrical signals from one wall of a groove on a disc and the direction indicated by arrows B—B' (hereinafter identified as "vibration of the left direction which is transduced as the left electrical signals from the other wall of the groove on the disc"). This is because the movement of the cantilever 1 when vibrating in the right direction A—A', for example, applies a force which resilently deforms the cylindrical damper 7 and as the deformation is transmitted through out the damper 7 effect is to move a central axis G of the armature 3 to a position G'. This affects the movement of the cantilever 1 in the left direction B—B' causing a crosstalk between the two channels.

For this reason, separation between the right channel electrical signals and the left channel electrical signals from the stereophonic pick-up cartridge is degradated.

FIG. 3 is a plot of the output frequency response of the left channel signals L and the output frequency response of crosstalk of the left channel electrical signals with the right channel indicated as L→R.

SUMMARY OF THE INVENTION

It is an object of the present invention to provide an improved novel stereophonic pick-up cartridge free from the drawbacks of the prior art.

In the present invention, an armature is positioned in air gap and stereophonic signals are reproduced by a vibration of the armature in response to the configurations of a groove on a disc. Mounted between a fixed support and the armature, is provided a cylindrical damper which abuts with the fixed support and the armature. Grooves are formed between the armature and the cylindrical damper so as to reduce the vibration mutual interference caused by vibration of the right and left directions and these grooves are formed on the surface of the cylindrical damper which abuts the armature. Since the vibrations of the armature can be clearly distinguished into the vibrations in the right and left directions, the separation between the right channel electrical signals and the left channel electrical signals will be substantially improved over cartridges of the prior art.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 4:
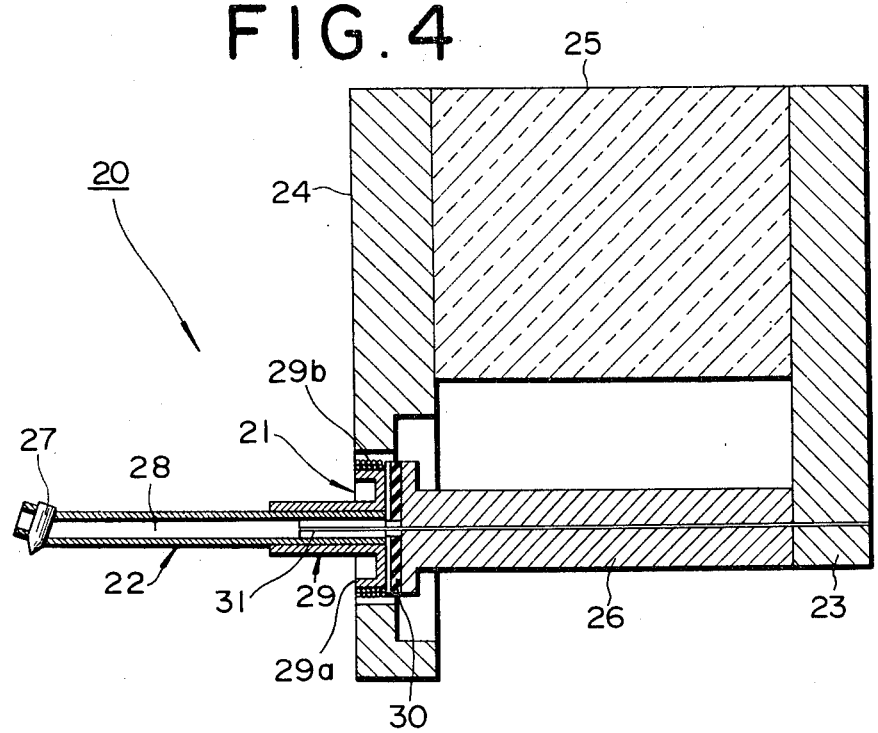
FIG. 4 is a cross-sectional view of a moving coil type stereophonic pick-up cartridge according to the invention.

FIG. 4 illustrates a stereophonic moving coil type cartridge 20 according to the invention. It is to be realized, of course, that the invention also applicable to a permanent magnet type coil. The cartridge 20 includes a magnetic circuit 21 and a vibrating circuit 22. The magnetic circuit 21 includes a pair of yokes 23 and 24 with a magnet 25 fixed between the pair of yokes 23 and 24 at one end and a pole piece 26 is fixed between the other ends of the yokes 23 and 24. The vibration system 22 includes a stylus 27 mounted on the end of a cantilever 28 and an armature 29 is mounted on the other end of the cantilever 28. The rear end of the armature 29 is generally disc-shaped as shown and rests on a cylindrical damper 30 made of a flexible material such as butyl rubber and which has its one surface in abutting engagement with the pole piece 26 and its other parallel surface engaged with the armature 29. A piano wire 31 is secured to the pole piece 26 by a screw or other means not shown and the other end is attached to the cantilever 28. The armature 29 is firmly pressed against the cylindrical damper 30 due to the tension in the piano wire 31. The armature 29 comprises a coil bobbin 29a and coils 29b. The shape of the coils 29b and the bobbin 29a are clearly illustrated in FIG. 4. For more details relating generally to stereophonic pick-up cartridges reference may be made to the applicants' U.S. Pat. No. 4,090,039.

Figure 5:
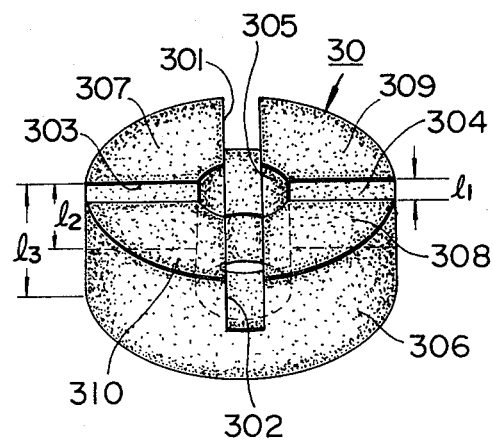
FIG. 5 is a perspective view of the cylindrical damper of the invention.

FIG. 5 is an enlarged detailed perspective view of the cylindrical damper 30 of the invention. The cylindrical damper 30 has cross-shaped grooves 301, 302, 303 and 304 which extend from the central aperture 305 to the outer periphery 306 formed in the surface which abuts with the armature 29. These grooves divide the surface of the damper 30 into four portions 307, 308, 309 and 310. The grooves 301, 302, 303 and 304 extend in from the engaging surface of the damper 30 with the armature 29 and the grooves 301 and 302 are normal to the grooves 303 and 304 as shown.

Figure 6:
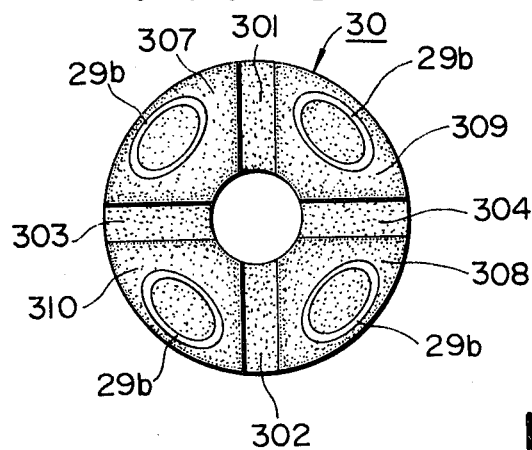
FIG. 6 is an elevation view of the cylindrical damper and illustrates the location of the coils in the invention.

The coils 29b are wound on the coil bobbin 29a and are located above each of the abutting portions 307, 308, 309 and 310 as illustrated in FIG. 6, according it is apparent that the grooves 301 and 302 are normal to a playing record disc plane and the grooves 302 and 304 are parallel to the plane. The dimension of the width of the groove can be 0.3 mm if the diameter of the bamper is 2.5 mm, and the depth 12 of the grooves can be equal to one-half of the thickness 13 of the bamper 30 as illustrated in FIG. 5. The grooves 301 and 304 contribute not to be pulled the portions 307 and 308 toward the portion 309 by deformation when the cantilever 28 vibrating the right direction as to deform the portion 309 as compression deformation and deform the portion 310 as pull deformation, the grooves 302 and 303 contribute not to be pulled the portion 307 and 308 toward the portion 310 by deformation when the cantilever 28 vibrating the right direction as to deform the portion 310 as compression deformation and deform the portion 309 as pull deformation. Accordingly, the contribution of the grooves 301, 302, 303 and 304 prevent a movement of a central axis of the armature 29 due to the deformation of the damper 30 when the cantilever 28 vibrating the right direction, for example. Due to the prevention of the movement of the central axis of the armature 29 by the grooves 301, 302, 303 and 304, there will be not crosstalk generated between the left and right channels as occurs in the prior art device.

Figure 7:
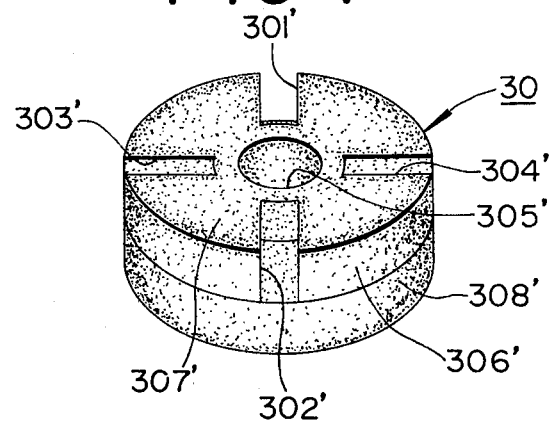
FIG. 7 is a perspective viwe of the cylindrical damper of the invention according to a further embodiment.

FIG. 7 illustrates a modification of the damper 30 of the invention wherein the damper 30 is formed with grooves 301', 302', 303' and 304' which extend from the outer periphery 306' of the damper 30 toward the center opening 305'. However the grooves terminate before they reach the central opening 305' as illustrated in FIG. 7. The grooves 301', 302', 303' and 304' may be formed by attaching a first flexible disc 307' to a lower cylindrical damper disc member 308'. The grooves reduce the mutual interference caused by vibration in the right and left directions caused by the deformation of the damper, because, when one portion of the abuting surface of the damper is compressed by the vibration of the cantilever, the one portion pulls the both neighboring portions thereto primarily in the peripheral portion rather than the central portion of the abuting surface.

Figure 8:
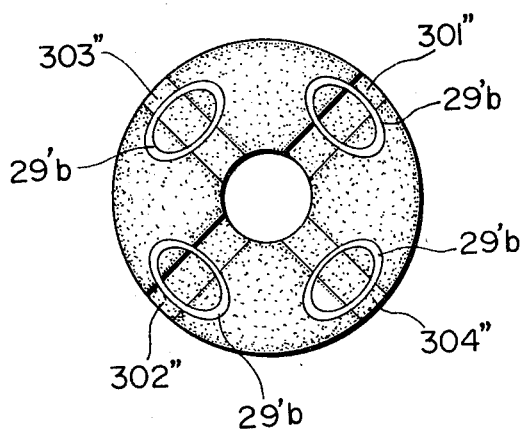
FIG. 8 is an elevational view of the cylindrical damper and illustrates the coils of the invention according to the modification of FIG. 7.

FIG. 8 illustrates the cylindrical damper 30 and the location of the coil 29b wherein the grooves 301" and 302" are parallel to the direction of vibration in the right direction with the grooves 303" and 304" being parallel to the direction of vibration in the left direction. The coils 29'b are located above each of the grooves.

Figure 1:
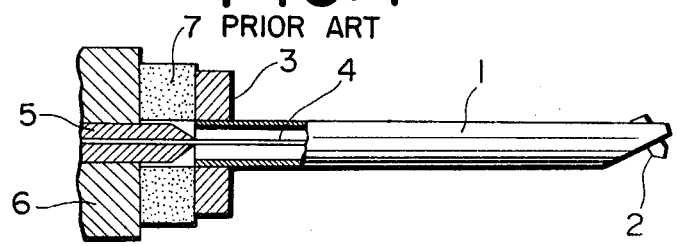
FIG. 1 is a segmentary and partially sectional view of the prior art pick-up cartridge.
Figure 2:
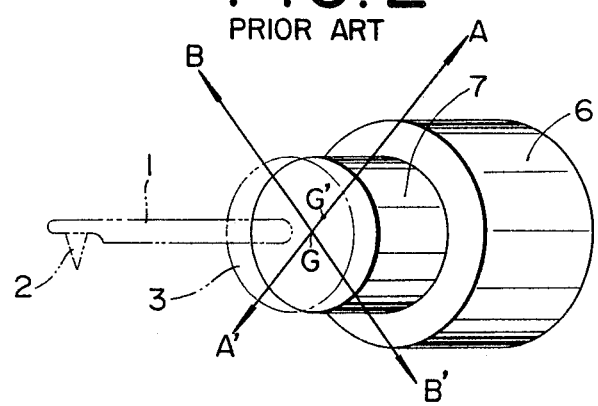
FIG. 2 is a perspective view of the cartridge of FIG. 1.
Figure 3:
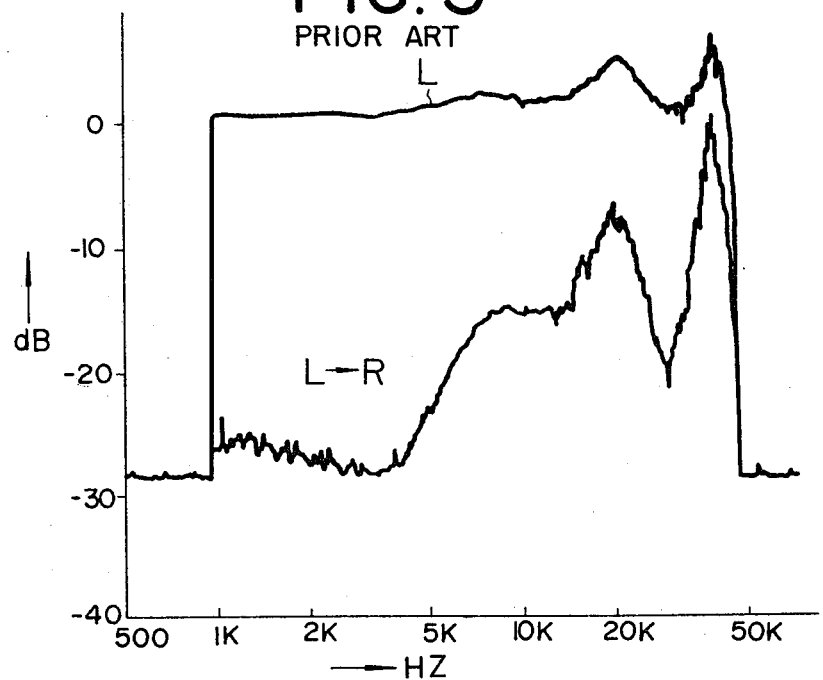
FIG. 3 is a plot of the frequency response illustrating the crosstalk in the prior art pick-up cartridge of FIGS. 1 and 2.
Figure 9:
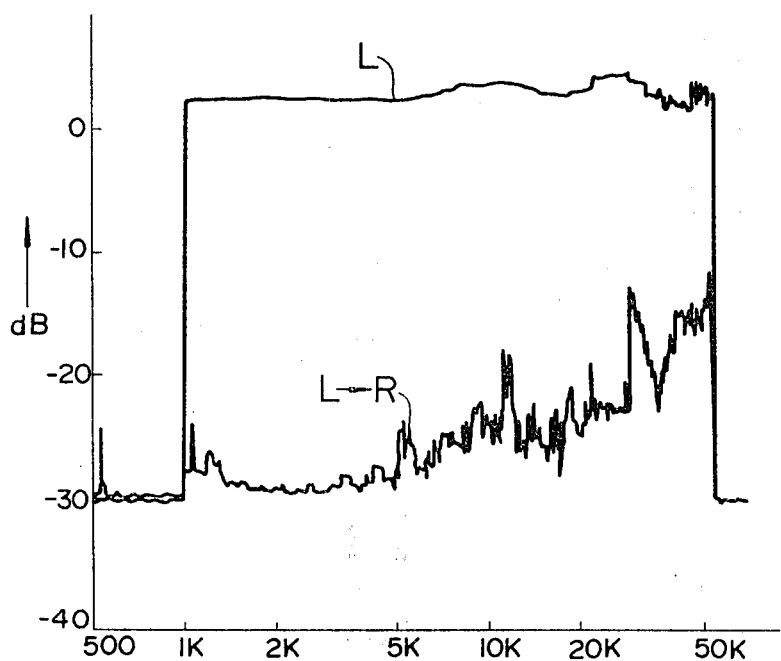
FIG. 9 is a plot of the frequency response and crosstalk in the invention.

FIG. 9 comprises a plot of the output frequency response of the left channel signals L as well as the output frequency of the crosstalk response comprising the left channel electrical signals relative to the right channel electrical signals L→R. It is to be noted that as can be seen by comparing FIG. 9 with FIG. 3 that the crosstalk response in FIG. 9 is much less than that illustrated in FIG. 3. Thus, much improved frequency response occurs in the apparatus of the invention particularly at the higher frequencies.

Many different embodiments of the invention may be made without departing from the spirit and scope thereof, and it is to be understood that the invention is not limited to the specific embodiments thereof except as defined by the appended claims.

We claim as our invention:

1. An armature supporting mechanism for a stereophonic pick-up cartridge comprising, a cantilever having a stylus on a free end thereof and an armature having a transverse surface at the rear end thereof, a fixed support, a damper having a first plane surface abutting on said fixed support and a second plane surface abutting on said transverse surface of said armature, and grooves formed in said second plane surface of said damper and extending generally radially from adjacent the central axis of said damper to the periphery of the damper, to reduce crosstalk between the two channels.

2. An armature supporting mechanism for a stereophonic pick-up cartridge according to claim 1 for playing a record disc, in which a first pair of said grooves have longitudinal directions which extend in a direction parallel to the surface of said record disc and a second pair of said grooves have longitudinal directions which extend in a direction normal to the surface of said record disc.

3. An armature supporting mechanism for a stereophonic pick-up cartridge according to claim 1 for playing a record disc, in which one of said grooves is directed to a first direction which is parallel to one wall of a signal groove on said record disc and the other to a second direction which is parallel to the other wall of said signal groove on said record disc.

4. An armature supporting mechanism for a stereophonic pick-up cartridge according to claim 1 in which said armature is held firmly pressed against said second plane surface of said damper by a tensioned piano wire.

5. An armature supporting mechanism for a stereophonic pick-up cartridge according to claim 1 wherein said damper is cylindrically shaped.

6. A supporting mechanism for a stereophonic pick-up cartridge comprising, a fixed support, a damper, a cantilever with a stylus on its free end for engaging a record disc and a magnetic means with a planar surface, tension means between said fixed support and said cantilever to hold said cantilever flexibly against said damper and said damper against said fixed support, a first groove extending in a first direction and a second groove in a second direction which is substantially normal to said first direction, said grooves being formed in a planar surface of said damper which engages said planar surface of said magnetic means, and said grooves extending from adjacent the central axis of said stylus to the periphery of the damper.

7. A supporting mechanism for a stereophonic pick-up cartridge comprising, a cantilever with a stylus on its free end for engaging a record disc and a magnetic means with a planar surface on its rear end for producing stereophonic signals from said record disc, a fixed support, a damper of flexible material with two parallel planar surfaces mounted between said fixed support and said planar surface of said magnetic means, tension means between said fixed support and said cantilever to hold said cantilever flexibly against said damper and said damper against said fixed support, a central opening formed through said damper through which said tension means extends, a first pair of longitudinally aligned grooves extending in a first transverse direction and a second pair of longitudinally aligned grooves extending in a second transverse direction across the one of said two planar surfaces of said damper which engages said planar surface of said magnetic means, said first pair of grooves and said second grooves not extending to said central opening formed through said damper, and said first and second directions making an angle of about 90 degrees in the plane of said planar surface.

* * * * *